United States Patent [19]

Nutter et al.

[11] Patent Number: 5,623,829
[45] Date of Patent: Apr. 29, 1997

[54] VORTEX TUBE COOLING SYSTEM FOR SOLDER REFLOW CONVECTION FURNACES

[75] Inventors: Francis C. Nutter, Methuen; Mark Hutchings, Westford, both of Mass.

[73] Assignee: BTU International, North Billerica, Mass.

[21] Appl. No.: 587,466

[22] Filed: Jan. 17, 1996

[51] Int. Cl.⁶ .................................... F25B 9/02
[52] U.S. Cl. ............................. 62/5; 62/266
[58] Field of Search ........................ 62/5, 266

[56] References Cited

U.S. PATENT DOCUMENTS

| | | | |
|---|---|---|---|
| 1,952,281 | 3/1934 | Ranque | 62/170 |
| 3,097,686 | 7/1963 | Morrow | 62/5 |
| 3,173,273 | 3/1965 | Fulton | 62/5 |
| 3,181,415 | 5/1965 | Laing | 88/24 |
| 3,208,229 | 9/1965 | Fulton | 62/5 |
| 3,236,298 | 2/1966 | Laing | 165/124 |
| 3,254,706 | 6/1966 | Laing | 165/86 |
| 3,654,768 | 4/1972 | Inglis et al. | 62/5 |
| 3,788,391 | 1/1974 | Laird | 62/5 |
| 3,858,403 | 1/1975 | Dunn | 62/5 |
| 4,061,189 | 12/1977 | Moncrieff-Yeates | 165/168 |
| 4,333,017 | 6/1982 | O'Connell | 290/2 |
| 4,407,134 | 10/1983 | Snaper | 62/5 |
| 4,714,484 | 12/1987 | Kühl et al. | 55/170 |
| 4,913,711 | 4/1990 | Stewart | 55/269 |
| 5,010,736 | 4/1991 | York et al. | 62/5 |
| 5,234,157 | 8/1993 | Fletcher et al. | 228/219 |
| 5,280,177 | 1/1994 | Bruno | 250/343 |
| 5,340,016 | 8/1994 | Fletcher et al. | 228/219 |
| 5,344,478 | 9/1994 | Zurecki et al. | 75/709 |

*Primary Examiner*—Ronald C. Capossela
*Attorney, Agent, or Firm*—Weingarten, Schurgin, Gagnebin & Hayes LLP

[57] ABSTRACT

A vortex tube cooling system is presented. The cooling system contains one or more vortex tubes connected to a supply of compressed gas, the vortex tubes providing a stream of cold gas which cools product as it emerges from a furnace. The cooling system is particularly useful for cooling circuit boards emerging from a solder reflow convection furnace.

19 Claims, 3 Drawing Sheets

VORTEX TUBE COOLING SYSTEM FOR SOLDER REFLOW CONVECTION FURNACES

FIELD OF THE INVENTION

The invention relates generally to soldering of components via furnaces, and more particularly to the cooling of reflow soldered product.

BACKGROUND OF THE INVENTION

As is known in the art, after product (typically circuit boards) have been brought up to a high enough temperature to be reflow soldered, they need to be cooled. Typically, this cooling after reflow soldering requires a large cooling section including fans, heat exchangers, cooling water, cooling towers, and chillers or various combinations of these devices. Additionally, as solder is reflowed effluents such as flux contaminates are released into the atmosphere of the furnace. These flux contaminates can condense and collect on the heat exchangers, fans and product, requiring cleaning and maintenance of the parts of the conventional type furnaces and coolers.

Vortex tubes provide one manner of cooling. A vortex tube accepts compressed gas at an inlet which is obliquely disposed with respect to the tube body. The compressed gas enters the tube body at an angle and rapidly rotates helically towards an end. As a result of the rapid helical rotation of the gas (for example at approximately one million revolutions per minute), a vortex is produced within the tube in which the inner region of rotating gas is expanding and compressing the outer region of rotating gas. Thus, the outer region of rotating gas is acquiring heat from the inner region of rotating gas. At one end of the tube body a diaphragm has an opening which allows the hot, outer region of gas to escape, thereby providing a hot gas output stream, while redirecting the inner region of gas back through the tube. The opposite end of the tube body has a diaphragm which has an opening which allows the cold gas to escape, thereby providing a cold gas output stream. U.S. Pat. No. 1,952,281 issued to Joseph Ranque on Mar. 27, 1934 for a "Method and Apparatus for Obtaining From a Fluid Under Pressure Two Currents or Fluids at Different Temperatures", U.S. Pat. No. 3,208,229 issued to C. D. Fulton on Mar. 16, 1965 for a "Vortex Tube" and U.S. Pat. No. 3,173,273 issued to C. D. Fulton on Sep. 28, 1965 for a "Vortex Tube" disclose in greater detail a vortex tube, and Applicant hereby incorporates by reference these disclosures.

Vortex tubes have been used in variety of devices. U.S. Pat. No. 4,407,134 to Snaper discloses the use of vortex tubes in an air conditioning system, U.S. Pat. No. 5,344,478 to Zurecki et al. discloses the use of a vortex tube to cool molten metal, and U.S. Pat. No. 4,714,484 to Kuhl et al. discloses the use of a vortex tube in an IR Spectrophotometer.

SUMMARY OF THE INVENTION

A solder reflow cooling system incorporating one or more vortex tubes is disclosed. The cooling system has a housing located adjacent to the output of a solder reflow furnace and receives reflow soldered product as they exit the solder reflow furnace. The vortex tubes receive compressed gas as an input and discharge a cold temperature gas at one output and a hot temperature gas at another output. The cold temperature gas provided by the vortex tubes is directed on the product, thus cooling them. The hot temperature gas is directed outside the cooling system housing, or optionally, the hot gas output of the vortex tubes can be fed back to the furnace to supplement the heating action supplied by the furnace.

The cooling system is of compact size, requires a minimum of moving parts, does not require a water supply or drainage system, and is inexpensive to implement, operate and maintain. Also the condensation of flux and other volatiles on cold components is reduced, since the gas in the housing is not recirculated.

BRIEF DESCRIPTION OF THE DRAWINGS

The invention will be more fully understood from the following detailed description taken in conjunction with the accompanying drawings in which.

DESCRIPTION OF THE PREFERRED EMBODIMENT

Figure 1:
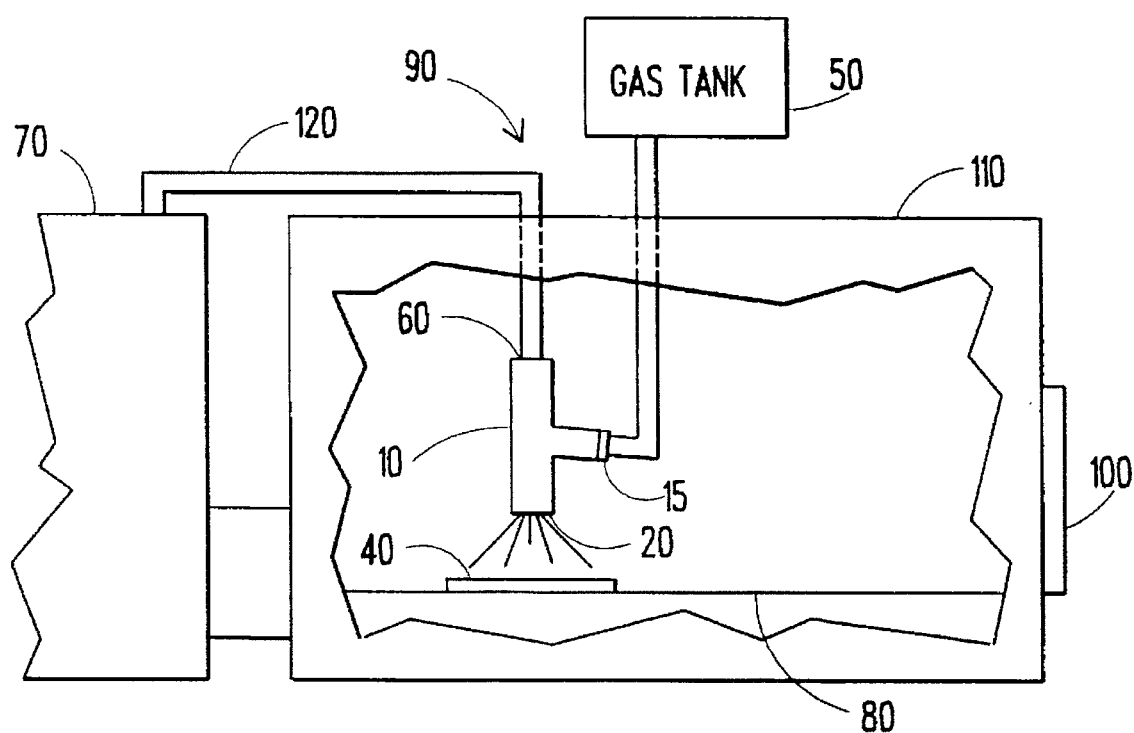
FIG. 1 is a diagram which shows a reflow soldering system including a solder reflow vortex cooler.

FIG. 1 shows a furnace cooling system according to the present invention. The cooling system forms a cooling section 90 adjacent to and communicating with the exit of a furnace 70 such as a solder reflow convection furnace. The cooling section 90 has a housing 110 and one or more vortex tubes 10 to provide cooling, discussed further below, disposed within the housing 110.

A conveyor assembly 80, which may be a conveyor belt, walking beam or other suitable device, is provided for moving a product such as assemblies 40 having components to be soldered through the furnace 70 and the cooling section 90. In this embodiment the cooling section 90 shown in FIG. 1 employs the same conveyor assembly as the furnace 70, though in an alternate embodiment cooling section 90 could have a conveyor assembly distinct and separate from the conveyor assembly 80 of the furnace 70. Any other suitable type of support assembly for receiving and supporting the product may be provided, depending on the application. As assembly 40, typically a circuit board or substrate having components, passes through the furnace 70 along conveyor assembly 80, the temperature of the assembly 40 is brought up to a level that causes the solder or solder paste deposited on the assembly 40 to melt. Once the solder has been melted it needs to be cooled in order to solidify and provide an electrical and/or mechanical connection between a component and the circuit board or substrate.

Figure 2:
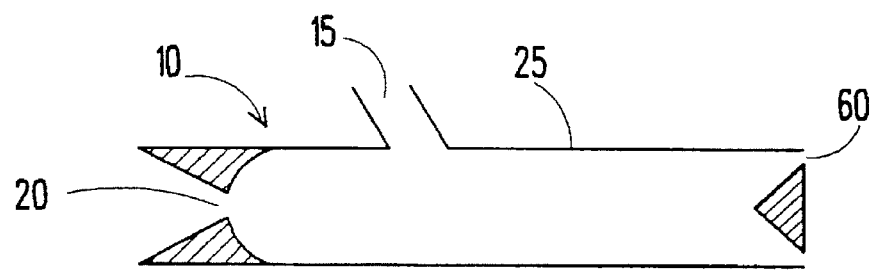
FIG. 2 is a cross sectional diagram of a vortex tube.

Cooling section 90 has one or more vortex tubes 10 disposed adjacent to the conveyor assembly 80. For simplicity, only a single tube is illustrated in FIG. 1. The particular arrangement, number, and spacing of the vortex tubes and the distance from and orientation with respect to the product are dependent upon the type of product and the amount of cooling needed, as would be apparent to one of ordinary skill in the art. The vortex tubes 10 (see FIG. 2) receive compressed gas from a compressed gas source 50, such as a compressor or tank of compressed gas, through an inlet 15, which enters the tubular body 25 of the vortex tube 10 tangentially to impart a vortex to the flow of gas through the tubular body 25. Cold gas discharges from one output 20 into the interior of the housing 110, hot gas discharges from another output 60 and is directed to ambient outside the housing 110. Optionally, the hot gas can be provided to furnace 70 via conduit 120 to supplement the heating action provided by furnace 70. Typically, the gas is air or $N_2$.

As the product 40 move along conveyor assembly 80 within cooling section 90, they are brought into proximity with the cold gas provided by the vortex tubes 10. The cold gas provided by the vortex tubes blows upon the product, thus cooling them. The temperature and flow rate of the cold gas provided by the vortex tubes 10 are controlled by the cold fraction adjustments found on the vortex tubes 10 or by adjustment of the compressed gas source 50. In such a manner the molten solder becomes solidified and provides electrical and/or mechanical connections between the circuit board and the components.

Figure 4:
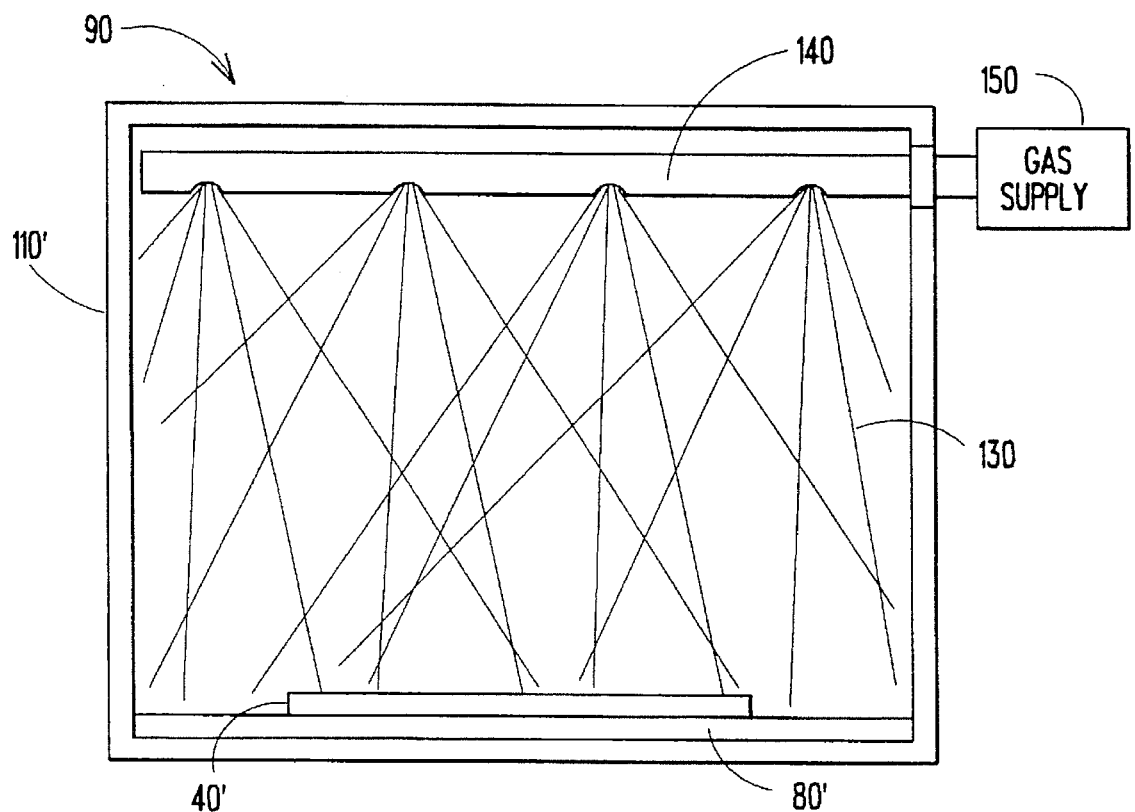
FIG. 4 is an end view of a solder reflow vortex cooler showing a gaseous curtain.
Figure 5:
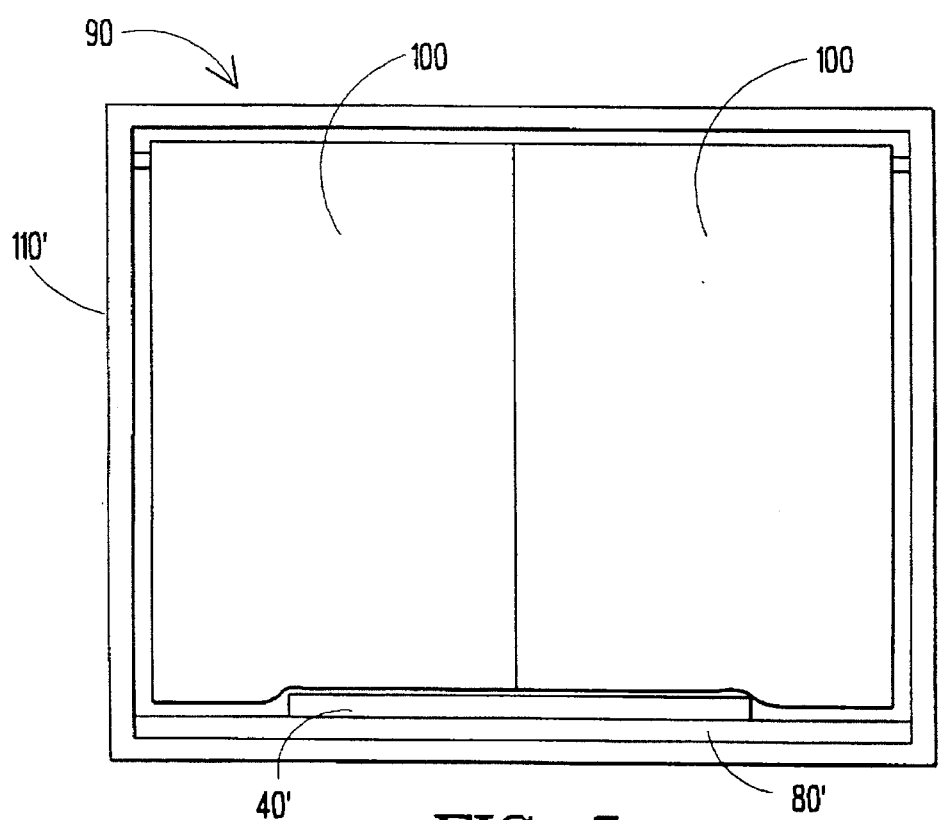
FIG. 5 is an end view of a solder reflow vortex cooler showing a physical curtain.

The cooling section 90 may also have barrier curtains 100 disposed about the exit of cooling section 90 as shown in FIG. 5. When $N_2$ is used as the gas for cooling, it is important to prevent mixing of the outside air with the $N_2$ atmosphere within the cooling section. Physical curtains 100 may be used to isolate the atmosphere inside the cooling section 90 from the ambient air. These curtains are disposed about the exit of the cooling section 90, and the product 40 exiting the cooling section 90 brush aside the curtains 100 as they exit. Alternatively, as shown in FIG. 4, a gaseous curtain 130 may be provided by an apertured tube 140 disposed across the upper opening of the cooling section exit perpendicularly to the direction of movement of conveyor assembly 80. A compressed gas is supplied to the tube 140 from gas supply 150, and exits the apertures forming a sheet of gas 130 across the exit of cooling section 90, thus keeping the $N_2$ atmosphere of cooling section 90 on one side of the gaseous curtain 130, and the atmosphere of the surrounding environment on the opposite side of the gaseous curtain 130.

In a particular embodiment for cooling solder reflowed product, four vortex tubes 10 are disposed in a line perpendicular to the movement of the conveyor assembly 80, the tubes 10 being spaced five inches apart center to center. Alternatively, the vortex tubes could be disposed parallel to the movement of conveyor assembly 80 or in an array. The vortex tubes 10 receive compressed gas at a minimum pressure of 50 psig, and preferably at 100 psig from a compressor or tank. Commercially available vortex tubes can provide temperatures as low as −40° F. at the cold outlet, and as high as 200° F. at the hot gas outlet at high input pressures. For cooling reflow soldered product, vortex tubes such as the Exair model number 3215, available from Exair of Cincinnati, Ohio, are suitable. The 3215 vortex tube provides cold gas at a temperature of approximately 40° F. and a flow rate of approximately 56 liters/minute from the cold gas outlet, and provides hot gas at a temperature of approximately 85° F. at the hot gas outlet from a compressed air source providing air at a range of approximately 50–70 psig, which is generally satisfactory for cooling reflow soldered assemblies. The speed of the product 40 through the cooling section 90, the vortex tube input pressure and the cold fraction adjustment can be adjusted to ensure that the product 40 are cooled at a maximum ramp rate of 3° C./second.

The vortex tubes 10 within cooling section 90 take in fresh, clean gas as opposed to conventional approaches which recirculate air that typically contains flux contaminates. These flux contaminates can condense and collect on the heat exchangers, fans and product, requiring cleaning and maintenance of the parts of the conventional type coolers. By use of the vortex tubes and their supply of compressed gas, there is no recirculation of the air and thus no condensation of flux contaminants inside the cooling section. Accordingly, cleaning and maintenance are minimal.

Figure 3:
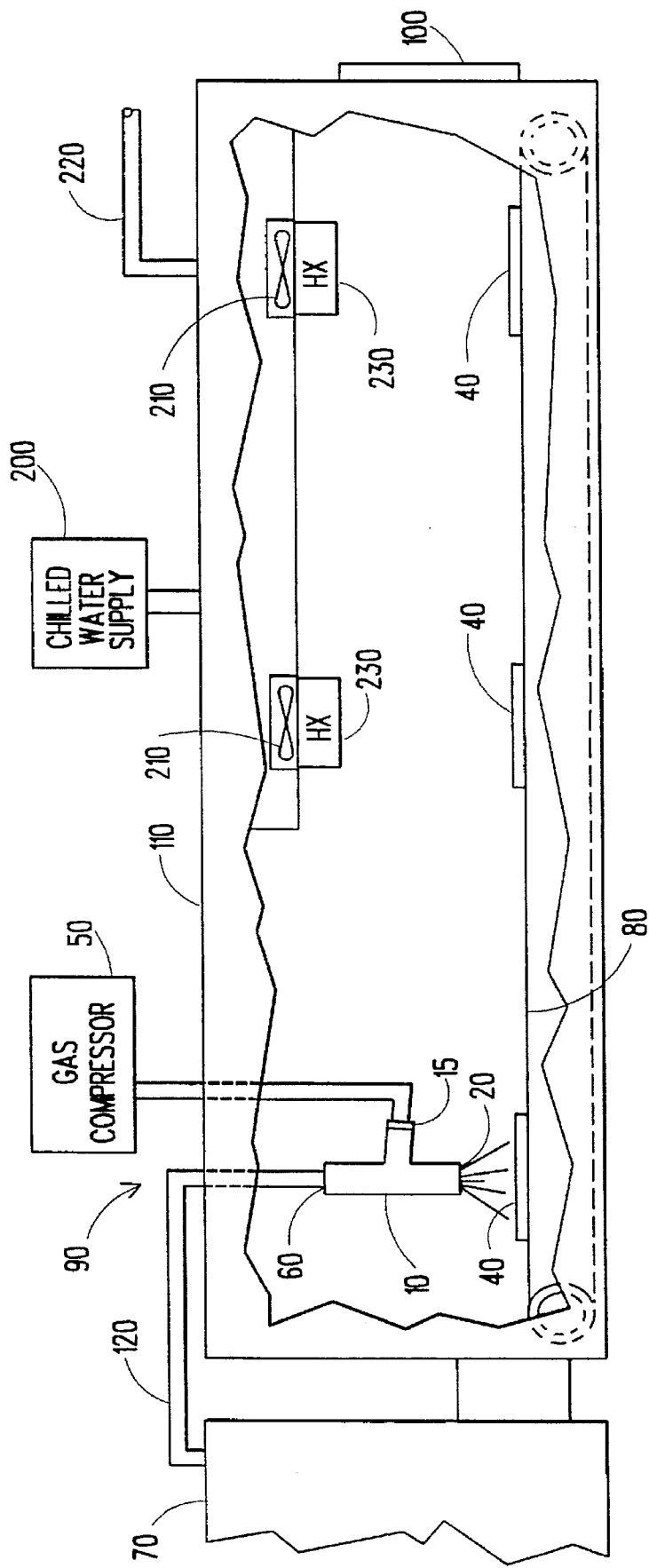
FIG. 3 is a diagram which shows a reflow soldering system including a solder reflow vortex cooler including conventional cooling elements.

Referring now to FIG. 3, the vortex tubes can also be used in combination with conventional cooling elements, such as fans 210 and heat exchangers 230. For example, the vortex tubes may be used to cool the soldered product to below the condensation temperatures of the solder and other volatiles. The conventional cooling elements are disposed downstream in the cooler environment where they may provide additional cooling without accumulating condensation products. Heat exchangers 230 are provided with chilled water by chilled water supply 200, and the water exiting the heat exchangers 230 is delivered to a drainage system via conduit 220.

In accordance with the present invention, the product 40 are cooled in a minimum amount of space by a cooling section 90 which has no moving parts, does not require a cold water source or drainage system and is inexpensive to implement, operate and maintain.

Having described preferred embodiments of the invention it will now become apparent to those of ordinary skill in the art that other embodiments incorporating these concepts may be used. For example, although the invention has been described with respect to a solder reflow convection furnace, the present cooling system can be used with other types of furnaces where it is necessary or desired to provide cooling to a product exiting the furnace. For example, the furnace 70 can be an infra-red furnace, a microwave furnace, a vapor-phase system, a hot air furnace or other conventional solder reflow system. Accordingly, it is submitted that the invention should not be limited to the described embodiments but rather should be limited only by the spirit and scope of the appended claims.

We claim:

1. A cooling system for cooling product discharged from a furnace, said cooling system comprising:

a housing defining a cooling space within said housing, said housing having an entrance opening at a first end and an exit opening at a second end;

a support assembly disposed within said housing for receiving and supporting the product for cooling; and a vortex tube disposed within said housing, said vortex tube comprising a tubular body, an inlet to an interior of the tubular body disposed to receive gas from a source of compressed gas, the inlet located to impart a vortex to gas within the tubular body, a cold gas outlet located at one end of said tubular body to discharge cold gas from said interior of said tubular body, said cold gas outlet in communication with said cooling space, a hot gas outlet located at an opposite end of said tubular body to discharge hot gas, said hot gas outlet disposed to direct hot gas outside of said housing.

2. The cooling system of claim 1 further comprising conduit in communication with said hot gas outlet and furnace to direct hot gas into the furnace.

3. The cooling system of claim 1 wherein the compressed gas is air.

4. The cooling system of claim 1 wherein the compressed gas is $N_2$.

5. The cooling system of claim 1 wherein the compressed gas is supplied at a pressure of at least 50 psig.

6. The cooling system of claim 1 wherein the compressed gas is supplied at a pressure of approximately 100 psig.

7. The cooling system of claim 1 wherein the vortex tube is configured to supply a temperature drop of at least 30° F. from ambient when supplied with a compressed gas at a pressure of at least 50 psig.

8. The cooling system of claim 1 further comprising a cooling element located in the housing downstream of the vortex tube.

9. The cooling system of claim 1 further comprising a plurality of vortex tubes disposed within said cooling system.

10. The cooling system of claim 9 wherein said plurality of vortex tubes are disposed in a line perpendicular to the direction of movement of the support assembly.

11. The cooling system of claim 9 wherein said plurality of vortex tubes are disposed in a line parallel to the direction of movement of the support assembly.

12. The cooling system of claim 9 wherein said plurality of vortex tubes are disposed in an array.

13. The cooling system of claim 1 further comprising a barrier disposed adjacent said exit opening to keep the cold gas isolated from ambient environment.

14. The cooling system of claim 13 wherein said barrier comprises gaseous curtains.

15. The cooling system of claim 13 wherein said barrier comprises physical curtains.

16. The cooling system of claim 1 wherein the support assembly comprises a conveyor assembly.

17. The cooling system of claim 16 wherein said conveyor assembly comprises a conveyor belt.

18. The cooling system of claim 1 wherein said compressed gas source comprises a compressor.

19. The cooling system of claim 1 wherein said compressed gas source comprises a gas tank.

* * * * *